Patented Nov. 14, 1950

2,530,056

UNITED STATES PATENT OFFICE 2,530,056

NUTRITIONAL AND CONDITIONING COMPOSITION FOR BAKED WHEAT FLOUR PRODUCTS

Julius J. Handler, Chicago, and Derrill B. Pratt, Jr., Evanston, Ill., assignors to Chapman & Smith Company, Chicago, Ill., a corporation of Illinois No Drawing. Application April 29, 1944, Serial No. 533,400

8 Claims. (Cl. 99—91)

The present invention relates to a new and improved nutritional and conditioning composition adapted to be used as a constituent of the dough for baked wheat flour products. The composition is particularly useful for white bread, but may be used with equal advantage for any baked products which are made of wheat flour or a flour mixture containing a substantial proportion of wheat flour, and which are largely dependent on yeast for leavening of the dough.

Various objects of the invention reside in the provision of a novel composition which, when used in suitable amounts as an ingredient of the dough, will produce baked products of greatly improved quality and increased nutritious value.

Another object is to provide a new and improved composition which supplies added nutrients important to the life and growth of human body tissues, and including certain nutrients not contained in the protein of wheat flour.

A further object is to provide a novel composition which will produce baked products of improved texture, appearance, uniformity and keeping qualities.

Another object of the invention is to provide a new and improved composition of the foregoing character which will impart added nutritious value to the baked products without incidentally introducing production problems, and which, more particularly, will assist fermentation, and afford control of the physical characteristics of the dough in order to insure proper handling thereof in the production equipment.

The composition, which constitutes the invention, generally comprises, in proper proportions, a nutritional agent having a high protein content, such for example as consisting of or including soya flour, to add certain desired nutrients to the baked products, calcium sulphate (CaSO$_4$) to counteract certain undesirable properties of the soya flour tending to impair the quality of the dough, and a malt product, such for example as malted wheat flour, having a balanced diastatic and proteolytic action, to assist fermentation and to modify the action of the calcium sulphate.

Soya flour is high in protein content and very nutritious. By mixing soya flour with the wheat flour, important nutrients are added, including some that are not contained in wheat flour alone, and the resulting mixture contains substantially all of the important proteins essential to the life and growth of human body tissues. The use of soya flour is particularly advantageous in instances where milk is not added in the dough mixture. Soya flour also contributes an improved enzyme action aiding fermentation of the dough.

The fat content of the soya flour should be restricted since fat, if present in substantial amount, would tend to impart an objectionable taste to the baked products and to develop rancidity in warm storage. Excessive fat also would tend to decrease the elasticity of the dough and to extend the development time unduly for commercial practice. Consequently, soya flour having a low fat content is used. Satisfactory results are obtainable with the use of soya flour having a fat content up to substantially six per cent (6%). However, a natural fat content as low as is practicably obtainable, such for example as one per cent (1%) of the soya flour, is preferred.

The amount of soya flour to be used may be varied within reasonable limits according to the added nutrition that is desired, but should not be excessive or raised to a level having a degrading effect on the volume and other quality requirements of the baked products. Preferably, the soya flour content is restricted to amounts in a range from substantially two to five per cent (2 to 5%) by weight of the wheat flour in the dough mixture. The optimum amount of soya flour is substantially three per cent (3%).

While the soya flour adds important nutrients to the baked products, it would, if used alone as a nutritional agent, seriously interfere with control of the dough and render the latter very difficult to handle. As is well understood in the art, wheat flour contains proteins which in the presence of water will combine to form gluten. This product is an elastic and tenacious substance having great stretching power, and providing a skeleton structure for retaining the other ingredients of the mixture to form a smooth glutenous dough. In the conditioning of the dough during fermentation, the gluten will expand evenly, while retaining a fine cellular structure to hold the gas produced by the action of the yeast. In order to facilitate proper expansion of the cellular structure and to provide a dough that is easy to handle in the mechanical equipment, the gluten should be strong and tough so as to prevent breaking of the strands or filaments, and should also be pliable and elastic to promote the required modulus of extensibility.

When soya flour alone is added to most wheat flours in the dough mixture, it tends to weaken and liquefy the gluten. As a result, the dough will become very wet and sticky, and unable to withstand the strain of gas expansion during baking, and the finished product will have a bloated volume of poor texture and crumb characteristics.

The sticky dough also introduces a difficult production problem in that it will not handle easily, but will adhere to the rollers and other parts of the production equipment, such as the mixers, dividers, rounders and molders. In general, a product of low quality and having a poor cell structure will be obtained.

To counteract the deleterious properties of the soya flour affecting the control and condition of the dough, calcium sulphate ($CaSO_4$) is added to the composition. The calcium sulphate is a drying and toughening agent, and acts to strengthen the gluten strands so that they will retain their gas retention properties in the presence of the soya flour, and produce a dough that is smooth and easy to handle. The feel of the dough is dry, elastic and pliable, without any trace of stickiness. The calcium sulphate thus serves to inhibit the excessive volume bloat which would result if soya flour alone were used, and in general to control the volume of the baked products and provide an increased mixing tolerance.

The amount of calcium sulphate that is required for a wide tolerance of operating conditions will vary to some extent in accordance with the percentage of soya flour added to the wheat flour. If an excessive amount of calcium sulphate is used, it will tend to toughen the gluten unduly, and render the dough difficult to mold. Tests have shown that, for satisfactory results, the calcium sulphate may be added to the composition in amounts within a range of from substantially .003%, as a minimum, to substantially .02%, as a maximum, by weight, based on the wheat flour content of the dough. Preferably, an optimum level of substantially .011% of calcium sulphate is used to obtain maximum benefits and proper toughening for good handling of the dough.

While the calcium sulphate serves to strengthen the gluten strands in counteraction to the soya flour enzymes, it also has the effect if present as the only modifying agent of leaving the strands comparatively tough and inelastic. The strands do not have the tender or mellow strength conducive to proper expansion of the gluten during gas evolution, and the retention of a fine uniform cell structure. Consequently, the dough is likely to suffer a loss in volume, and to form an irregular shred at the break along the edge of the pan.

The effect of the calcium sulphate on the gluten, therefore, is modified by the addition to the composition of a suitable malt product having a balanced diastatic and proteolytic action. Preferably, malted wheat flour, which contains both protease and diastase, is used. The proteolytic enzyme acts to soften the gluten strands and to mellow them so that they will possess maximum extensibility. The diastatic enzyme converts the starch to fermentable sugars which are acted on by the yeast to produce carbon dioxide ($CO_2$) and other fermentation products for leavening the bread and improving its flavor. The addition of diastase is particularly desirable because natural wheat flour is usually deficient in this enzyme. The use of malted wheat flour as the source of protease is important because its protease content is low and uniform and, hence, permits definite and accurate control of the mellowing action on the gluten. Thus, the malted wheat flour contains protease and diastase in properly balanced proportions to insure optimum mellowing of the gluten and optimum gas production.

The amount of malted wheat flour that is required for a wide tolerance of operating conditions will vary to some extent in accordance with the percentages of soya flour and calcium sulphate present in the composition. Tests have shown that satisfactory results are obtainable if the malted wheat flour is added in amounts over a range from substantially .04%, as a minimum, to substantially .45%, at a maximum, by weight, based on the amount of natural wheat flour in the dough mixture. For optimum results, substantially .065% of malted wheat flour is used.

Recapitulating, the improved nutritional and conditioning composition, in its preferred constituency, comprises soya flour having a low fat content, calcium sulphate, and malted wheat flour, which interpolating the foregoing percentages, may be combined by weight in substantially the following relative proportions:

| | Parts |
|---|---|
| Soya flour having a fat content in a range of from zero to 6%, from | 2 to 5 |
| Calcium sulphate, from | .003 to .02 |
| Malted wheat flour, from | .04 to .45 |

The optimum proportions of these ingredients are substantially as follows:

| | Parts |
|---|---|
| Soya flour containing no more than 1% fat | 3 |
| Calcium sulphate | .011 |
| Malted wheat flour | .065 |

When the optimum proportions are employed, the composition permits of a wide tolerance in operating conditions and controls.

The net effect of the treatment of a wheat flour dough by the composition is to add important and essential nutrients to the baked products, to toughen the gluten so as to withstand the degrading action exerted by the soya flour, and then to mellow the gluten to its optimum elasticity. The resulting dough is sufficiently dry not to be pasty and sticky and yet is soft and pliable enough to be molded. The addition of the composition in the comparatively small amounts that are required will not dilute the gluten unduly so that, in the case of bread, a loaf of high quality and proper size is obtained.

The composition, as herein, described, includes three coacting ingredients, but it is to be understood that the invention is not limited to the use of these ingredients alone, but is broad enough to cover these ingredients and any equivalents thereof, with or without the addition of still other ingredients which it may be desirable to introduce into the dough mixture. It is also to be understood that while the range of percentages herein disclosed afford the best results, the invention is not necessarily limited to the compounding of the ingredients in amounts coming within these ranges where other amounts thereof would produce the desired results.

We claim as our invention:

1. A nutritional and conditioning composition for dough containing wheat flour and yeast, said composition comprising the following ingredients in the following proportions, by weight:

| | Parts |
|---|---|
| Soya flour containing between zero and six per cent fat | 2 to 5 |
| Calcium sulphate ($CaSO_4$) | .003 to .02 |
| Malted wheat flour | .04 to .45 |

2. A nutritional and conditioning composition comprising the following ingredients in substantially the following proportions, by weight:

| | Parts |
|---|---|
| Soya flour containing substantially one per cent fat | 3 |
| Calcium sulphate (CaSO$_4$) | .011 |
| Malted wheat flour | .065 |

3. A nutritional and conditioning composition for dough containing wheat flour and yeast, said composition comprising the following ingredients in the following proportions, by weight:

| | Parts |
|---|---|
| Soya flour containing between zero and six per cent fat | 2 to 5 |
| Calcium sulphate (CaSO$_4$) | .003 to .02 |
| Malted wheat flour | .065 |

4. A nutritional and conditioning composition for dough containing wheat flour and yeast, said composition comprising the following ingredients in the following proportions, by weight:

| | Parts |
|---|---|
| Soya flour containing between zero and six per cent fat | 2 to 5 |
| Calcium sulphate (CaSO$_4$) | .011 |
| Malted wheat flour | .04 to .45 |

5. A nutritional and conditioning composition for dough containing wheat flour and yeast, said composition comprising the following ingredients in the following proportions, by weight:

| | Parts |
|---|---|
| Soya flour containing between zero and six per cent fat | 3 |
| Calcium sulphate (CaSO$_4$) | .003 to .02 |
| Malted wheat flour | .04 to .45 |

6. A nutritional and conditioning composition for dough containing wheat flour and yeast, said composition comprising the following ingredients in the following proportions, by weight:

| | Parts |
|---|---|
| Soya flour containing between zero and six per cent fat | 2 to 5 |
| Calcium sulphate (CaSO$_4$) | .011 |
| Malted wheat flour | .065 |

7. A nutritional and conditioning composition for dough containing wheat flour and yeast, said composition comprising the following ingredients in the following proportions, by weight:

| | Parts |
|---|---|
| Soya flour containing between zero and six per cent fat | 3 |
| Calcium sulphate (CaSO$_4$) | .003 to .02 |
| Malted wheat flour | .065 |

8. A nutritional and conditioning composition for dough containing wheat flour and yeast, said composition comprising the following ingredients in the following proportions, by weight:

| | Parts |
|---|---|
| Soya flour containing between zero and six per cent fat | 3 |
| Calcium sulphate (CaSO$_4$) | .011 |
| Malted wheat flour | .04 to .45 |

JULIUS J. HANDLER.
DERRILL B. PRATT, Jr.

REFERENCES CITED

The following references are of record in the file of this patent:

UNITED STATES PATENTS

| Number | Name | Date |
|---|---|---|
| 579,739 | Clowes | Mar. 30, 1897 |
| 1,225,878 | Simons | May 15, 1917 |
| 1,300,604 | Greville | Apr. 15, 1919 |
| 1,356,988 | Johns | Oct. 26, 1920 |
| 1,630,143 | Sullivan | May 24, 1927 |
| 1,956,913 | Veron | May 1, 1934 |
| 2,035,586 | Bonotto | Mar. 31, 1936 |
| 2,067,908 | Epstein et al. | Jan. 19, 1937 |
| 2,067,912 | Frey et al. | Jan. 19, 1937 |
| 2,137,027 | Pollak | Nov. 15, 1938 |

FOREIGN PATENTS

| Number | Country | Date |
|---|---|---|
| 30,350 | Great Britain | 1910 |

OTHER REFERENCES

Le Clerc et al., American Soybean Assn. Food Research Contribution No. 303, Sept. 1936, page 3.